Jan. 16, 1940.                 T. H. MILLER                    2,187,359
            SUPPORT FOR NECK BEARING OF CENTRIFUGAL SEPARATORS
                        Filed Nov. 17, 1937

WITNESS:

INVENTOR

Theodore H. Miller
BY
Busser and Harding
ATTORNEYS.

Patented Jan. 16, 1940

2,187,359

UNITED STATES PATENT OFFICE 2,187,359

SUPPORT FOR NECK BEARINGS OF CENTRIFUGAL SEPARATORS

Theodore H. Miller, Poughkeepsie, N. Y., assignor to The De Laval Separator Company, New York, N. Y., a corporation of New Jersey Application November 17, 1937, Serial No. 174,922

1 Claim. (Cl. 308—147)

My invention is an improvement in means for yieldingly supporting the neck bearing of a centrifugal separator to permit slight, but resist great displacements thereof in a plane at right angles to the axis.

It is a well known fact that an object revolving at high speeds will tend to rotate about its center of gravity regardless of whether that coincides with the geometric axis or not. Centrifugal separators, particularly those used for removing solids from liquids, will load unevenly and rotate as above described, forcing the spindle to revolve eccentrically.

The object of my invention is to provide, for the neck bearing immediately below the centrifugal bowl, a yieldable support the resistance of which against movement can be easily adjusted to suit different conditions.

I know that it is old to suport such bearings by surrounding them with a ring of rubber or other material of similar characteristics. With such rings there is no possibility of changing the resistance to movement except by dismantling the machine and substituting another ring of different characteristics. I know that it is also old, in bobbin-supporting single-bearing spindles, to interpose a hollow ring cushion between the shaft and the spindle rail; and, in centrifugal separators, to provide a two-part metal bearing between the shaft and the frame and to interpose a hollow ring cushion between the two parts (which are relatively slidable radially) of the bearing. My invention embodies a hollow ring cushion interposed between a one-part bearing and the frame, the two latter elements being spaced apart and provided with opposing complementary concavities, together with provision for admitting pressure fluid to, or exhausting from, the ring cushion during the operations of the centrifuge, as hereinafter particularly described and as illustrated in two embodiments of the invention shown in the accompanying drawing, in which—

Other shapes may be used in case they better fit the conditions of use.

Figure 1:
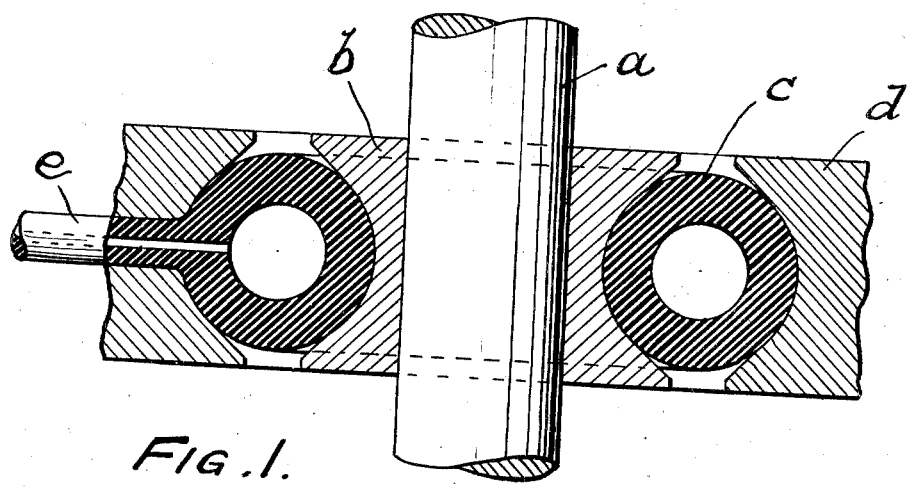
Fig. 1 is a vertical sectional view of a spindle bearing and a support therefor comprising a ring of circular cross section.

In Fig. 1: $a$ is the spindle of a centrifugal machine, $b$ a guiding bearing therefor, $c$ a yieldable supporting ring of circular cross section, $d$ a part of the frame of the machine, and $e$ a tube through which fluid may be forced into the ring.

Figure 2:
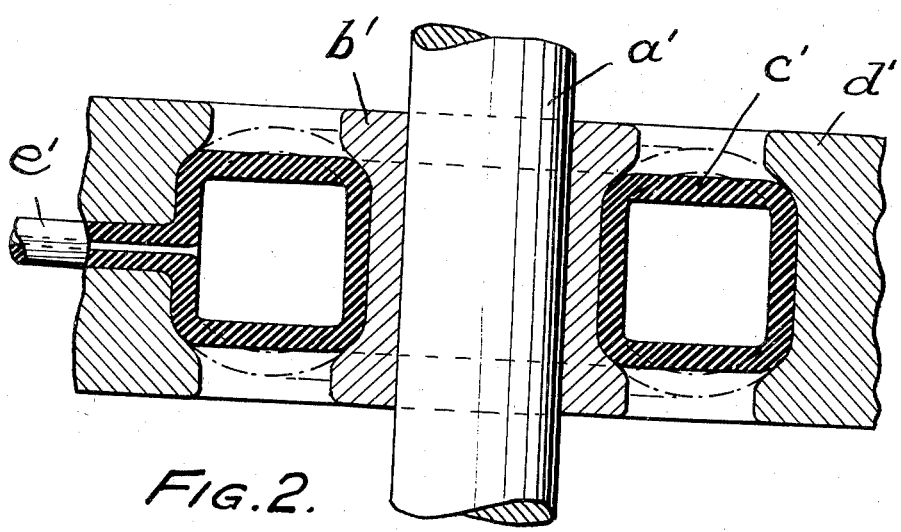
Fig. 2 is a similar view showing a ring of normally approximately rectangular cross section, as shown in full lines but which, under pressure, will be distorted as shown at the broken lines.

In Fig. 2: $a'$ is the spindle, $b'$ a guide bearing, $c'$ a yieldable supporting ring of approximately rectangular cross section, $d'$ a part of the frame, and $e'$ a tube through which fluid may be forced into the ring.

In Fig. 1 the ring, especially if its wall is thick, will not be materially distorted by increase of internal pressure, but its resistance to displacement of the spindle will be increased by increase of internal pressure.

In Fig. 2 the ring is so shaped and has a wall so relatively thin that increase of internal pressure will distort it in a vertical direction, as indicated by the broken lines.

When in use, if the resistance to eccentric movement of the spindle is too small, the operator will admit air or other fluid under pressure from a tank, a pump or other suitable source, not shown, to the inside of the ring, thus causing it to expand and press with greater force against the bearing and thereby increase the resistance to eccentric movement of the spindle. Resistance to eccentric movement may be reduced by partial exhaustion of fluid from the ring to thereby decrease the internal pressure.

While I have described my cushioning rings as made of rubber, they may also be made of so-called synthetic or artificial rubber, such as Duprene or Thyocole, or of a fabric, saturated or treated, if necessary, with any material that will make it fluid tight.

While the fluid forced into the ring is, in most cases, preferably air or other gas, water or other liquid is operable and in some cases may be preferable.

I claim:

A yieldable guide for the spindle of a centrifugal machine comprising a bearing of rigid material surrounding the spindle and in which the spindle has a close turning fit, said bearing having an exterior circular concavity between its upper and lower peripheries, a supporting frame surrounding the bearing and having between its upper and lower peripheries an interior circular concavity complementary to the exterior concavity in the bearing, the frame being spaced from the bearing, and a ring-shaped hollow cushion of flexible and elastic material positioned between said bearing and frame and filling said cavities and exteriorly unsupported for a distance radial of the spindle axis along its upper and lower walls, the cushion having an unobstructed opening and the frame having an unobstructed passage aligning with said opening to allow a pressure fluid to be admitted or exhausted during operation to govern the pressure in the cushion, thereby making adjustable the resistance of the cushion during operation.

THEODORE H. MILLER.